Aug. 21, 1956　　　　L. P. DELSASSO　　　　2,760,066
DELAYED TRIPPING CIRCUIT

Original Filed July 11, 1946　　　　2 Sheets-Sheet 1

INVENTOR.
LEO P. DELSASSO
BY
George E. Pearson
ATTORNEY

INVENTOR.
LEO P. DELSASSO

United States Patent Office 2,760,066
Patented Aug. 21, 1956

2,760,066

DELAYED TRIPPING CIRCUIT

Leo P. Delsasso, Los Angeles, Calif.

Original application July 11, 1946, Serial No. 682,757. Divided and this application July 1, 1952, Serial No. 299,930

7 Claims. (Cl. 250—27)

(Granted under Title 35, U. S. Code (1952), sec. 266)

This application is a division of application Serial No. 682,757, filed July 11, 1946, Patent No. 2,680,238, for Depth Charge Direction Recorder.

This invention relates to explosion direction indicators and more particularly to devices for recording the direction of depth charge explosions.

A recording type of depth charge direction indicator is useful in selecting the best escape course for a submarine to use while it is being subjected to an attack. A simple device capable of recording the general direction of as many as five depth charge explosions before it requires resetting has been found necessary. The device should be capable of recording another set of explosions upon pressing a reset button.

An object of this invention is to provide compact and rugged equipment which will indicate the direction of a depth charge explosion.

Another object is to provide a recorder which is positive in action and is capable of observing repeated explosions.

A further object is to provide a recorder which will give a quick visual indication of a plurality of depth charge explosions.

The invention also resides in certain novel features of electrical and mechanical component structures and arrangements which facilitate the carrying out of the foregoing objects and which contribute both to the simplicity of the device and to the reliability of operation as well as to the ease and expeditious manner of determining the direction of an explosion.

These results are obtained in the present device by an arrangement of four contact hydrophones located at equal distances on the circumference of a circle surrounding the conning tower of a submarine. A relay advanced switch is used to connect these hydrophones successively to groups of glow tubes arranged in series on a cross whose arms are related in position to the hydrophones.

Resistance circuits are provided to prevent more than one glow tube in each connected group from being ignited by a single explosion. An electronic delay device is employed to prevent the selector relay from being advanced more than once by a single explosion.

Other objects and advantages of the invention will become apparent from the following detailed description taken in connection with the accompanying drawings in which.

Figure 1:
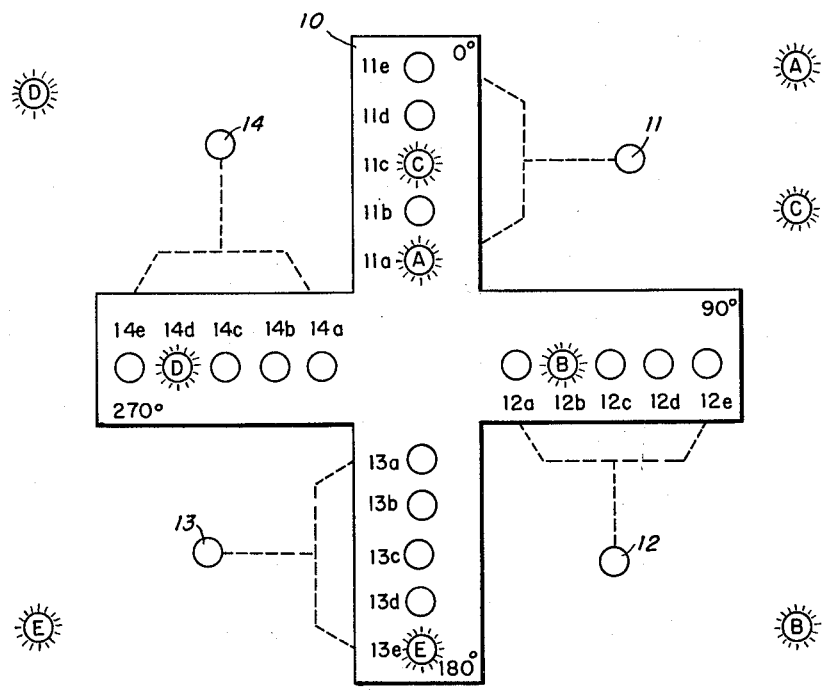
Figure 1 is a plan view of the glow tube arrangement.

While the invention is susceptible of various modifications and alternative arrangements, I have shown in the drawing and will herein describe in detail the preferred embodiments. It is to be understood, however, that I do not intend to limit the invention by such disclosure for I aim to cover all modifications and alternative arrangements falling within the spirit and scope of the invention as defined in the appended claims.

Figure 1 shows a cross-like arrangement 10 on which are mounted neon glow tubes. The four spokes of the cross are the 0° spoke, 90° spoke, etc. A series of tubes 11a through 11e is mounted in succession outwardly on the 0° spoke of the cross. The tubes are connected to hydrophone 11, which is disposed on the deck of the submarine at a relative bearing of about 045°. Tubes 12a through 12e are similarly arranged on the 90° spoke and connected to hydrophone 12 which is located at approximately 135° relative bearing on the submarine. Tubes 13a through 13e are located on the 180° spoke and connected to hydrophone 13 which is at a relative bearing of 235° on the submarine. Tubes 14a through 14e are located on the 270° spoke and are connected to hydrophone 14 which is located at a relative bearing of about 315°.

Figure 2:
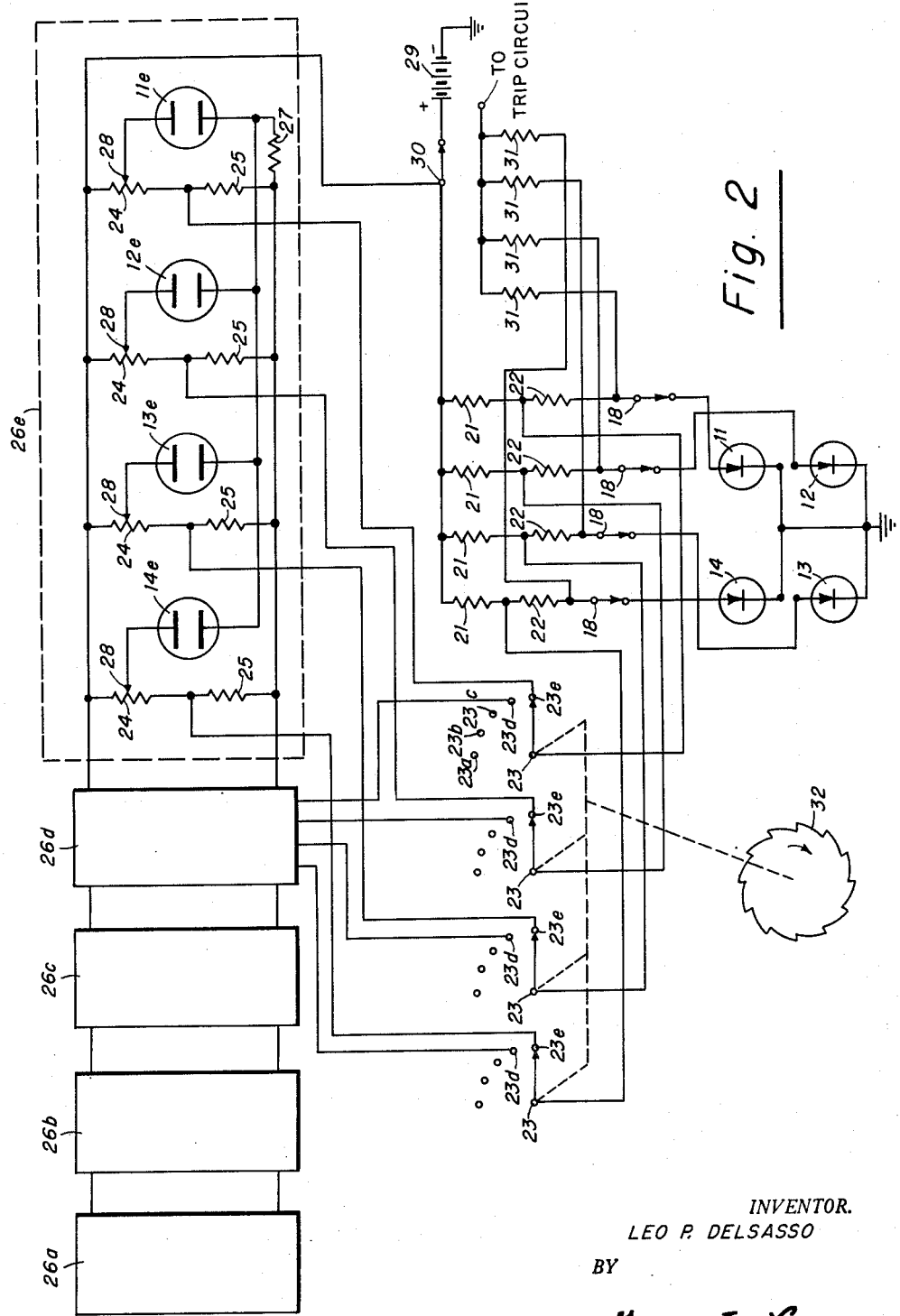
Figure 2 is a diagram of the electrical circuits from the hydrophones to the glow tubes.

Figure 2 shows the circuit for connecting each of the four hydrophones to one of a group of the neon glow tubes and for actuating one tube of each group for each explosion. In this circuit the contact type hydrophones 11 through 14 are each connected on one side to ground and on the other side to switches 18 which lead to resistances 21 and 22 which are in series with each of the hydrophones. The connection between resistances 21 and 22 in each case is further connected to one of a set of selector switches 23. These four switches are connected in gang fashion, and each is arranged to contact consecutively a similar point in one or four similar series each containing five switch points 23a through 23e. The four contacts 23e are connected to the connection points of series connected resistors 24 and 25 in unit 26e. Contacts 23a through 23d are connected in like manner to units 26a through 26d.

Glow tubes 11e through 14e are connected to resistor 27 which is grounded on the other side. Resistors 25 are similarly grounded. The other connections of the tubes go to variable contactors 28 which act on variable resistors 24. Resistors 24 are connected to a source 29 of positive potential through a switch 30, as are also the resistors 21. The negative side of the source 29 is grounded. The positive line from source 29 is connected to resistors similar to 24 in each of the units 26a through 26d. A line also runs from resistors 25 to similar resistors in units 26a through 26d. Resistor 27 is connected to ground as are similar resistors in units 26a through 26d. The connections between resistors 22 and switches 18 are connected to resistors 31 which are connected to the trip circuit. Ratchet wheel 32 is connected to the gang switches 23.

Figure 3:
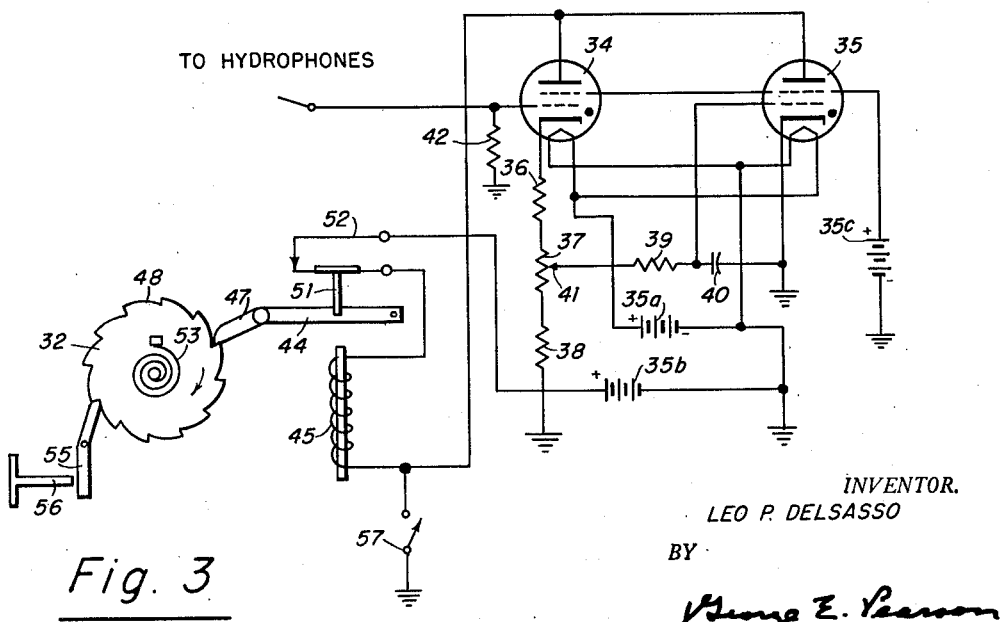
Figure 3 is a diagram of the electronic means which are used for advancing the selector relay, together with a schematic showing of the selector relay.

Figure 3 shows the trip circuit for actuating the selector ratchet wheel 32. The anodes of two grid controlled gas filled thermionic tubes 34 and 35 are connected together. The cathode of tube 34 is connected through series resistors 36, 37 and 38 to ground. The cathode of tube 35 is connected to ground. Series connected resistor 39 and condenser 40 are connected between the cathodes of the two tubes through a variable contactor 41 which connects resistor 39 to variable resistor 37. The heaters for tubes 34 and 35 are connected to a suitable source of potential 35A. The negative side of this source is connected to the negative side of a source of anode potential 35B. The screen grids of tubes 34 and 35 are connected to a source 35C of positive grid potential. The control grid of tube 34 is connected to the lead from the resistors 31 which are connected to the hydrophones. A resistor 42 is also connected to this grid and to ground. The control grid of tube 35 is connected between resistor 39 and condenser 40.

Solenoid arm 44 is pivotally mounted above solenoid 45. Pivoted pawl 47 is mounted at the outer end of arm 45 and engages the teeth 48 of ratchet wheel 32. Lug 51 engages switch 52. A spring 53 tends to rotate wheel 32 in a counterclockwise direction. Reset lever 55 is actuated by button 56. One end of the solenoid is connected through switch 52 to the tube anodes and the other end to the positive side of source 35B. The actuating force of solenoid 45 is insufficient, with the plate current of tube 34 alone, to actuate the solenoid arm 44, but is sufficient to actuate the solenoid arm with the combined plate currents of tubes 34 and 35. Selector switch 57 is used in adjustment.

In operation, the four contact hydrophones are located at equal distances on the circumference of a circle surrounding the conning tower of a submarine. These hydrophones are connected to the four series of five small neon glow lamps which provide a recording apparatus in the form of a cross to indicate the direction in which the explosion takes place. The hydrophone connections go through appropriate watertight fittings to the recording apparatus which is located in the interior of the vessel. Hydrophone 11 can be successively connected by solenoid operated selector switch 23 to any one of the glow lamps 11a through 11e on the 0° spoke. The switch 23 is actuated by the electronic trip circuit or by manual switch 57. Hydrophones 12 through 14 are similarly connected to lamps 12a through 12e, 13a through 13e and 14a through 14e.

The apparatus is actuated by the steep initial pressure pulse produced by the explosion of a depth charge. This pulse affects the four contact hydrophones in succession, opening first the contact of the hydrophone closest to the location of the explosion. Due to the circuits used and the well-known constant voltage characteristic of the glow lamps, only one glow lamp will be ignited by this opening of the hydrophone contact.

As is known a glow lamp has two critical voltages, one at which a glow just sets in and another at which the glow extinguishes. It also has a non-linear resistance characteristic which causes the glow tube, when operated in series with a resistance, to conduct a current, within limits, which produces a voltage drop across the resistance such as to maintain the voltage across the glow tube itself substantially constant at a value near its extinguishing voltage, in spite of variations in the voltage impressed on the series circuit. While any suitable voltage range may be used in this device, a satisfactory lamp is one having the following characteristics:

Upper critical voltage (striking potential) $E_u = 78$ volts (average value).
Maximum glow tube current $I = 748$ microamps.
Lower critical voltage $E_1 = 60$ volts (average value).
Mean voltage $(78+60)/2$ $E_m = 69$ volts.
Mean current $I_m = 400$ microamps.
Suitable resistor values as follows:

Resistor 21 = 10,000 ohms.
Resistor 22 = 20,000 ohms.
Resistor 24 = 25,000 ohms.
Resistor 25 = 50,000 ohms.
Resistor 31 = 30,000 ohms.

The potential source 29 should be about 90 volts for this type of lamp. The variable resistors 24 are set to provide a potential which is somewhat below the striking potential when the contact hydrophones are closed due to current flowing through resistors 21 and 22.

The "a" glow lamps are connected to the hydrophones in the initial position. When an explosion in the first quadrant opens the contacts of hydrophone 11, the current flow through resistors 21 and 22 is stopped. This raises the potential on the glow tube 11a in the 0° spoke from 69 to 84 volts causing it to ignite. Upon closing the hydrophone contact, the potential is reduced to a value of about 69 volts which is sufficient to keep the glow lamp 11a ignited.

As hydrophones 12 through 14 in this particular example will also be affected by the explosion, although somewhat later than hydrophone 11, glow lamps 12a through 14a would also be ignited if the circuits containing lamps 11a through 14a were not interconnected and suitably adjusted. Because of this connection, when an explosion ignites glow lamp 11a, it will also cause a current flow of about 400 microamps through resistor 27 which maintains the potential across the remaining glow tubes in the first section at a potential which is insufficient to ignite the tube. Hence, only the glow tube on the 0° spoke can be ignited when an explosion takes place in the quadrant of hydrophone 11.

After an explosion the electronic trip circuit advances the selector switches 23 to connect the hydrophones to the next group of glow lamps to record the next explosion. An underwater explosion causes a report due to a sudden expansion, then a report due to a sudden contraction, and often a series of such reports. Accordingly, provision has to be made for recording only the first report; otherwise several glow lamps will ignite instead of only one for each explosion. This is done by means of the thyratron circuit shown in Figure 3. When a sound pulse from a depth charge explosion A actuates hydrophone 11, the potential of the control grid of tube 34 is changed sufficiently to cause the tube to strike. This is due to opening a circuit to ground through the hydrophone 11. When the tube strikes, a small current is started through resistances 36, 37 and 38 setting up a potential difference across resistance 39 and condenser 40. This causes condenser 40 to charge slowly and after a few seconds to alter sufficiently the potential on the control grid of tube 35 to cause it to strike. The combined plate current of both tubes is sufficient to activate solenoid 45 which pulls down arm 44 and advances the selector switch ratchet wheel 32 to the next position. Due to lug 51 on the arm 44 which opens the switch 52, the plate circuit current is broken and both tubes are extinguished. The time delay provided by this circuit avoids repeated operation of the device from a single depth charge.

When an explosion has been recorded on one of the "a" lamps, the gang selector switches 23 connect the "b" tubes to the hydrophones due to the advancing of the relay ratchet wheel 32 by means of the electronic circuit. A second explosion will ignite the appropriate "b" tube and the selector relay will move one notch forward to connect the hydrophones to the "c" tubes. After five explosions have been recorded in the device illustrated, the reset button 56 can be pushed so that the ratchet wheel will be driven back to its original position by spring 53, thus switching the apparatus so that the "a" tubes are again connected to the hydrophones. Switch 30 should also be opened at this time in order to extinguish all glow lamps which have been ignited by the previous explosions. If desired this switch may be hooked to reset button 56 in order that pushing this button will also open switch 30. As shown, successive explosions B, C, D and E light lamps 12b, 11c, 14d and 13e. The gang switch is shown in the "e" position in Figure 2.

Switch 57 is used when adjusting to obtain the correct potential on the glow tubes and is manually operated. In carrying out such adjustment, contactors 28 are set on resistors 24 at the point of minimum potential. Switch 30 is closed but the heater current source is disconnected so that actuation can be made only by the manual selector switch 57. With the hydrophone 11 connected in the circuit as is always the case for the normal condition of the hydrophone, contactor 28 for tube 11a is gradually brought toward a position of maximum potential until the tube ignites. This position is marked. The contactor is again set at minimum potential and switch 30 is opened and then closed again. Opening the switch stops the glow discharge of tube 11a and closing the switch causes a potential across the glow tube which is not sufficient to initiate a glow discharge. With the switch 18 in the hydrophone 11 circuit open, the potential is again raised until a glow discharge appears in tube 11a. This position is also marked. The resistance is then adjusted to a point midway between the two marks. This is the correct position for operation of tube 11a on the 0° spoke. In order to adjust to the correct position of the contactor for tube 11b, it is necessary to close the manual selector switch 57 so that tube 11b is connected into the circuit, this switch normally being open. Hereafter, the adjustment is the same as described above. The correct settings of contactors 28 are similarly found for glow lamps 11c, 11d and 11e. After this is done, the reset button 56 is pushed and the potentials for the 90° lamps are adjusted as above. The 180° and 270° lamps are similarly adjusted. The switches 18 are normally closed, being used only to open the hydrophone circuits in testing.

The invention described herein may be used by or for the Government of the United States for governmental purposes without the payment to me of any royalties thereon or therefore.

What is claimed is:

1. In a time delay switching circuit, first and second normally nonconducting grid controlled gas tubes each having a cathode, an anode, and a control grid, a relay having a winding requiring a predetermined actuating current, a source of anode power, means connecting said winding between the anodes of said tubes and said source of anode power, a first resistor connecting the cathode of said first gas-filled grid controlled tube to ground, means for selectively rendering said first grid controlled gas filled tube conductive, said first tube conducting a current less than the predetermined actuating current of said relay winding means to ground the cathode of said second tube, said second tube conducting, when rendered conductive, a current which when added to the current conducted by said first tube exceeds the predetermined actuating current of said relay winding, a second resistor connecting the control grid of said second tube to the cathode of said first tube, and a capacitor connected between the control grid and the cathode of said second tube, whereby actuation of said relay occurs after said first tube is rendered conductive by a time interval determined by the constants of said second resistor and said capacitor.

2. The device as claimed in claim 1 further characterized by normally closed contacts actuated by said relay connected in the anode circuit of said first and second tubes, whereby actuation of said relay restores said tubes to nonconduction.

3. A control circuit comprising a pair of normally nonconducting gaseous electronic discharge devices, means for rendering one of said devices conductive a predetermined time after the other of said devices is rendered conductive in response to an input signal, and output means responsive to combined conduction of both said devices for providing a controlled output delayed with respect to said input signal.

4. The circuit of claim 3 wherein said last mentioned means includes means for rendering both said devices nonconducting.

5. A control circuit for effecting delayed actuation of apparatus to be controlled comprising first and second normally nonconducting gaseous discharge tubes, means for causing said first tube to conduct, means energized by conduction of said first tube for causing conduction of said second tube to be initiated after initiation and before termination of conduction of said first tube, means for combining the concurrent conduction of said tubes and means responsive to said combined conduction for effecting actuation of said apparatus.

6. The circuit of claim 5 including means for causing energization of said combined conduction responsive means to render said tubes nonconducting.

7. A delayed control circuit comprising first and second normally nonconducting gaseous discharge tubes having a common plate lead connecting the tube plates to a common potential source, means for ionizing said second tube a predetermined time after ionization of said first tube is effected in response to an input signal, switch means in series between said plates and said source, and means series connected in said plate lead and responsive to combined current conducted during concurrent ionization of both said tubes for actuating said switch means to deionize both said tubes.

References Cited in the file of this patent

UNITED STATES PATENTS

| | | |
|---|---|---|
| 2,003,992 | Cockrell | June 4, 1935 |
| 2,011,381 | Suits | Aug. 13, 1935 |
| 2,147,468 | Stoddard | Feb. 14, 1939 |
| 2,197,414 | Place | Apr. 16, 1940 |
| 2,280,949 | Hall | Apr. 28, 1942 |
| 2,602,888 | Audier | July 8, 1952 |